3,230,217
19-NOR-Δ⁴-9β,10α-17,21-DIOL-PREGNANE DERIVATIVES
Albert Bowers, John Edwards, and Pierre Crabbé, Mexico City, Mexico, assignors to Syntex Corporation, Panama, Panama, a corporation of Panama
No Drawing. Filed Aug. 26, 1963, Ser. No. 304,681
20 Claims. (Cl. 260—239.55)

The present invention relates to certain new cyclopentanophenanthrene derivatives.

More particularly, the present invention relates to the novel 19-nor-corticoids with abnormal configuration at the centers of asymmetry of the steroid skeleton, particularly at carbon atoms 9 and 10, which are further substituted at C–6 and/or C–16.

The transformation of the normal steroid configuration of 19-nor-steroids into the 9β,10α-configuration has been found to have a remarkable effect on the physiological properties of the compounds in comparison with those of the normal 9α,10β-series.

The compounds of the present invention are valuable cortical hormones with high anti-inflammatory, low catabolic, glycogenic and thymolytic activities. In addition, they are anti-androgenic, anti-gonadotrophic and anti-estrogenic hormones. Furthermore, they have high topical activity in skin disorders such as psoriasis, allergic dermatitis and the like.

The novel compounds of the present invention are represented by the following formulas

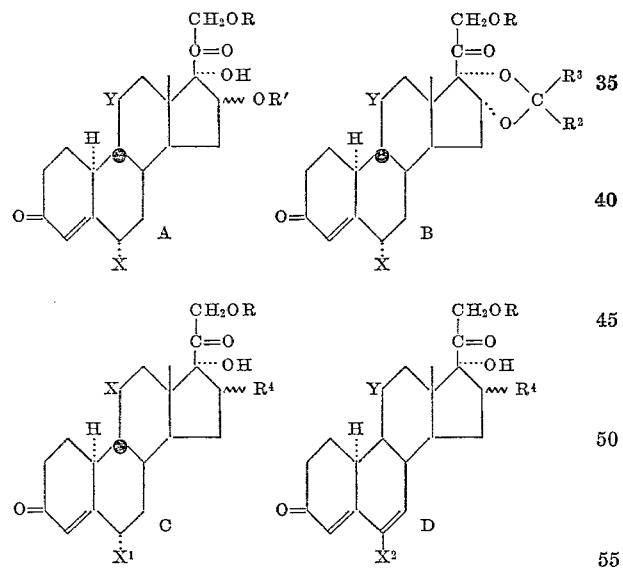

In the above formulas, R and R¹ represent hydrogen or a hydrocarbon carboxylic acid radical of less than 12 carbon atoms; R² represents a lower alkyl group of less than 8 carbon atoms; R³ represents hydrogen, lower alkyl, an aryl or aralkyl group of less than 8 carbon atoms; R⁴ represents hydrogen, α-methyl, β-methyl, α-hydroxy and α-acyloxy; in addition, when R⁴ is α-hydroxy; R⁴ together with the hydroxyl group at C–17 may represent the group

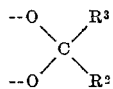

wherein R² and R³ have the meaning hereinbefore indicated; X represents hydrogen or methyl; X¹ represents chlorine or fluorine; X² represents hydrogen, methyl, chlorine or fluorine; and Y represents hydrogen, β-hydroxy and keto.

The acyl groups above referred to are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetic, propionate, enanthate, benzoate, trimethylacetate, t-butylacetate, phenoxyacetate, cyclopentylpropionate, aminoacetate, and β-chloropropionate.

The compounds represented by A and B are obtained by the process illustrated by the following equation:

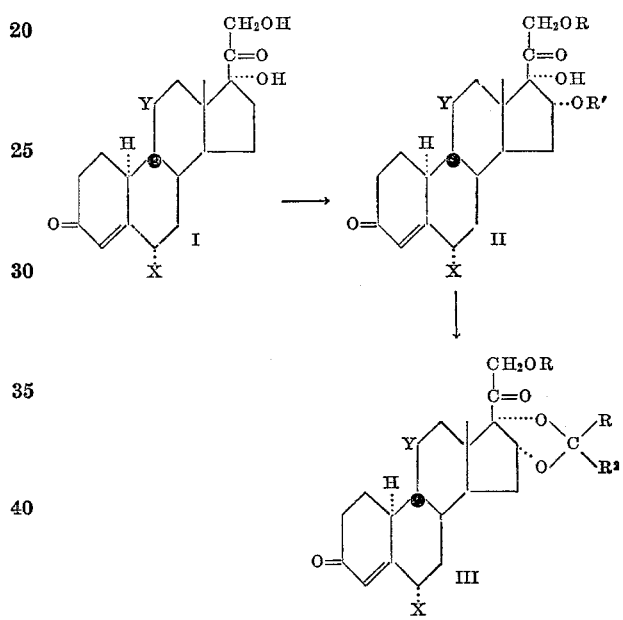

In the above formulas R, R¹, R², R³, X and Y have the same meaning as heretofore set forth.

In practicing the process just outlined, the starting materials Δ⁴ - 19 - nor-9β,10α-pregnene-17α,21-diol-3,20-dione, Δ⁴ - 19-nor-9β,10α-pregnene-11β,17α,21-triol-3,20-dione, Δ⁴ - 19 - nor-9β,10α-pregnene-17α,21-diol-3,11,20-trione and the 6α-methyl derivatives thereof (I), described in our copending patent application Serial No. 210,211, filed July 16, 1962, are subjected to microbiological oxidation with the microorganism Streptomyces roseochromogenus, to thus form the corresponding 16α-hydroxylated derivatives (II; R and R¹=H). Conventional esterification of these compounds with hydrocarbon carboxylic acid anhydrides of less than 12 carbon atoms in pyridine solution produce the 16,21-diesters (II; R and R¹=acyl).

By reaction of the free compounds with a ketone or aldehyde such as acetone, butanone, acetophenone, formaldehyde, acetaldehyde and the like, in the presence of catalytic amounts of perchloric acid there are produced the corresponding cyclic ketals or cyclic acetals (III; R=H) which upon conventional esterification give the respective 21-esters (III; R=acyl).

The 6α-fluoro and 6α-chloro-Δ⁴-19-nor-9β,10α-pregnene derivatives of formula C are obtained by the following sequence of reactions:

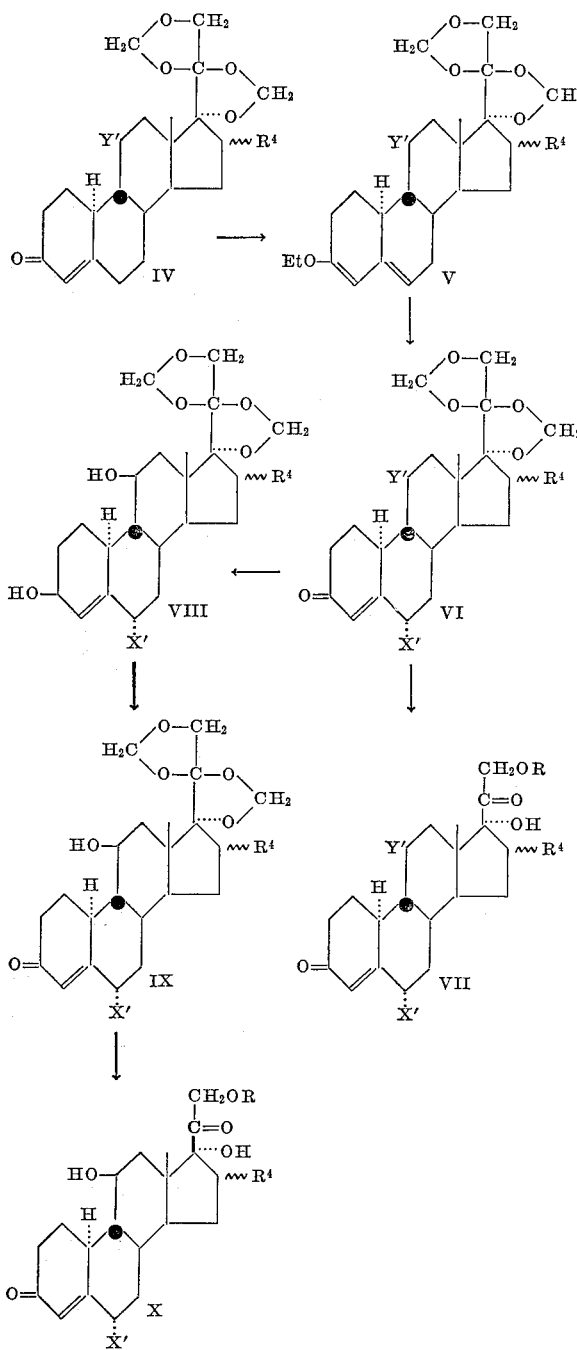

In the above formulas, R, R⁴ and X¹ have the same meaning as heretofore indicated; and Y¹ represents hydrogen or a keto group.

In practicing the process outlined above the starting materials, i.e. the 17,20;20,21-bismethylenedioxy derivatives of Δ⁴-19-nor-9β, 10α-pregnene-17α,21-diol-3,20-dione, Δ⁴ - 19 - nor - 9β, 10α-pregnene-17α,21-diol-3,11,20-trione, 16α or 16β-methyl-Δ⁴-19-nor-9β, 10α-pregnene-17α,21-diol-3,20-dione, 16α or 16β-methyl-Δ⁴-19-nor-9β, 10α - pregnene - 17α, 21-diol-3,11,20-trione,Δ⁴-19-nor-9β, 10α-pregnene-16α,17α,21-triol-3,20-dione, and Δ⁴-19-nor-9β,10α - pregnene - 16α,17α,21 - triol - 3,11,20-trione (IV) are treated with ethyl orthoformate in dioxane solution and in the presence of p-toluenesulfonic acid, to produce the corresponding 3 enol ethers (V). By reaction of these compounds with approximately 1 molar equivalent of N-chlorosuccinimide in acetone solution and in the presence of sodium acetate, there are obtained the 6β-chloro intermediates, which upon acid treatment, preferably by reaction with anhydrous hydrogen chloride at low temperature are isomerized to the 6α-chloro compounds (VI: X₁=chlorine).

When the 3 enol ethers (V) are reacted with perchloryl fluoride in dimethyl formamide solution, at low temperature, preferably around 0° C., there are produced the 6β-fluoro-Δ⁴-3-keto compounds which upon isomerization with dry hydrogen chloride in acetic acid afford the 6α-fluoro derivatives (VI; X¹=F).

By hydrolysis of the bismethylenedioxy group in a conventional manner, preferably by reflux with 60% formic acid, there are produced the 6α-chloro and 6α-fluoro derivatives of Δ⁴-19-nor-9β,10α-pregnene-17α,21-diol - 3,20-dione, Δ⁴-19-nor-9β,10α-pregnene-17α,21-diol-3,11,20-trione and those of the corresponding 16-substituted compounds (VII; R=H).

By reduction of the 6α - halo - 17,20;20,21-bismethylenedioxy-11-keto compounds (VI; Y¹=keto) with lithium aluminum hydride in tetrahydrofuran, at reflux temperature, there are produced the 3β,11-dihydroxy compounds (VIII), which upon selective oxidation with manganese dioxide in chloroform or 2,3-dichloro-5,6-dicyano-1,4-benzoquinone in dioxane, at room temperature, afford the 11-hydroxyΔ⁴-3-keto compounds (IX). The bismethylenedioxy group is then hydrolyzed with 60% formic acid, to produce the 6α-chloro and 6α-fluoro derivatives of Δ⁴ - 19 - nor - 9β,10α-pregnene-11β,17α,21-triol-3,20-dione, 16α - methyl - Δ⁴ - 19-nor-9β,10α-pregnene-11β, 17α,21 - triol - 3,20-dione, 16β-methyl-Δ⁴-19-nor-9β,10α-pregnene - 11β,17α,21-triol-3,20-dione and Δ⁴-19-nor-9β, 10α - pregnene - 11β,16α,17α,21 - tetrol - 3,20 - dione (X; R=H).

By reaction of the 6α-chloro and 6α-fluoro compounds further substituted at C-16α by a hydroxyl group (VII and X; R=H, R⁴=OH) with a ketone or aldehyde of the type previously mentioned there are produced the corresponding 16α,17α-cyclic ketals and acetals.

Conventional esterification of compounds VII and X (R=H) with carboxylic acid anhydrides of less than 12 carbon atoms in pyridine solution afford the respective esters.

By treatment of the 21-esters of Δ⁴-19-nor-9β,10α-pregnene - 17α,21 - diol - 3,20-dione, Δ⁴-19-nor-9β,10α-pregnene - 11β,17α,21 - triol - 3,20 - dione, Δ⁴-19-nor-9β,10α - pregnene - 17α,21 - diol-3,11,20-trione, the 6α-chloro, 6α-fluoro, 6α-methyl and 16-substituted derivatives thereof with a quinone having an oxidation-reduction potential of less than −0.5, such as benzoquinone, chloranil (tetrachlorobenzoquinone), 2,6-dichlorobenzoquinone and the like, at reflux temperature in t-butyl alcohol, t-amyl alcohol, xylene, toluene, etc., there are produced the corresponding 6-dehydro compounds, which can optionally be saponified by conventional methods, for example, by reaction with dilute potassium hydroxide solution in methanol, at low temperature and under nitrogen atmosphere.

Alternatively, the introduction of a double bond at C–6 can be effected in the bismethylenedioxy compounds (VI and VII) which upon hydrolysis with 60% formic acid give the 6 - halo - Δ⁴,⁶-19-nor-9β,10α-pregnadiene compounds.

Among the compounds thus obtained, there are Δ⁴,⁶-19 - 9β,10α - pregnadience - 17α,21-diol-3,20-dione, Δ⁴,⁶-19 - nor - 9β,10α-pregnadiene-11β,17α,21-triol-3,20-dione, Δ⁴,⁶ - 19 - nor - 9β,10α - pregnadiene-17α,21-diol-3,11,20-trione, 16β - methyl - Δ⁴,⁶ - 19-nor-9β,10α-pregnadiene-17α,21 - diol - 3,20 - dione, 16α - methyl - Δ⁴,⁶ - 19-nor - 9β,10α - pregnadiene - 11β,17α,21 - triol - 3,20-dione, 16α,17α - isopropylidenedioxy - Δ⁴,⁶-19-nor-9β, 10α - pregnadiene - 11β,21 - diol-3,20-dione, 6-chloro-Δ⁴,⁶ - 19 - nor - 9β,10α-pregnadiene-17α,21-diol-3,20-dione, 6 - fluoro - Δ⁴,⁶-19-nor-9β,10α-pregnadiene-11β, 17α,21 - triol - 3,20 - dione, 6-fluoro-16α-methyl-Δ⁴,⁶-19- nor - 9β,10α - pregnadiene - 11β,17α,21-triol-3,20-dione, 6 - methyl - Δ$^{4,6}$ - 19 - nor - 9β,10α - pregnadiene-17α,21-diol - 3,11,20 - trione, 6,16α - dimethyl - Δ$^{4,6}$-19-nor-9β,10α - pregnadiene - 11β,17α,21-triol-3,20-dione, and other similar compounds.

The following examples serve to illustrate but are not intended to limit the present invention:

PREPARATION 1

A solution of 1 g. of the 21-acetate of 16α-methyl-Δ$^4$-19-nor-9β,10α-pregnene - 11β,17α,21 - triol - 3,20 - dione, described in our copending patent application Serial No. 210,211, filed July 16, 1962, in 20 cc. of acetone was cooled to 0° C. and treated under an atmosphere of nitrogen and with stirring, with an 8N solution of chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave the 21-acetate of 16α-methyl-Δ$^4$-19-nor-9β,10α-pregnene-17α,21-diol-3,11,20-trione.

PREPARATION 2

A cold solution of 2 g. of 16α-methyl-Δ$^4$-19-nor-9β,10α-pregnene-17α,21-diol-3,20-dione 21-acetate in 50 cc. of methanol was treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 16α-methyl-Δ$^4$-19-nor-9β,10α-pregnene-17α,21-diol-3,20 dione.

In a similar manner, 6α-methyl-Δ$^4$-19-nor-9β,10α-pregnene-17α,21-diol-3,11,20-trione 21-acetate, 6α-methyl-Δ$^4$-19-nor-9β,10α-pregnene-17α,21-diol-3,20-dione 21-acetate, 16β-methyl-Δ$^4$-19-nor-9β,10α-pregnene - 17α,21-diol-3,20-dione 21-acetate, 6α,16α-dimethyl-Δ$^4$-19-nor-9β,10α-pregnene-17α,21-diol-3,20-dione 21-acetate and 16α-methyl-Δ$^4$-19-nor-9β,10α-pregnene-17α,21-diol - 3,11,20 - trione - 21-acetate were converted into the corresponding free compounds.

PREPARATION 3

To a solution of 1 g. of Δ$^4$-19-nor-9β,10α-pregnene-17α,21-diol-3,11,20-trione in 40 cc. of chloroform were added 8 cc. of 37% aqueous formaldehyde and 1 cc. of concentrated hydrochloric acid and the mixture was stirred for 48 hours at room temperature. The two layers were separated; the aqueous layer was washed with chloroform and the combined organic solutions were washed with water to neutral, dried over anhydrous sodium sulfate and evaporated to dryness. The residue was recrystallized from methanol-ether thus affording 17,20;20,21-bismethylenedioxy-Δ$^4$-19-nor-9β,10α-pregnene-3,11-dione.

By the same method, Δ$^4$ - 19 - nor - 9β,10α - pregnene-17α,21-diol-3,20-dione, 16α-methyl-Δ$^4$-19-nor-9β,10α-pregnene-17α,21-diol-3,20-dione, 16β-methyl-Δ$^4$-19-nor-9β,10α-pregnene-17α,21-diol-3,20-dione and 16α-methyl-Δ$^4$-19-nor-9β,10α-pregnene-17α,21-diol-3,11,20-trione were inverted respectively into 17,20;20,21-bismethylenedioxy-Δ$^4$-19-nor-9β,10α-pregnene-3-one, 16α - methyl - 17,20;20,21-bismethylenedioxy-Δ$^4$-19-nor-9β,10α-pregnene-3-one, 16β-methyl-17,20;20,21 - bismethylenedioxy-Δ$^4$-19-nor-9β,10α-pregnene-3-one and 16α-methyl-17,20;20,21-bismethylenedioxy-Δ$^4$-19-nor-9β,10α-pregnene-3,11-dione.

Example I

A culture of *Streptomyces roseochromogenus* ATCC 3347 was prepared in an inclined agar medium containing 1% of glucose and 1% of yeast extract. 1 cc. of a suspension of this culture was then used to innoculate each one of a series of 250 cc. flasks containing 50 cc. of a sterilized aqueous medium of 2% peptone and 5% corn syrup; the mixtures were then incubated in a shaking machine at 28° C. under aereation for a period of 24–48 hours. There was thus obtained a vegetating growing culture of *Streptomyces roseochromogenus* which was used for the subsequent incubation of the steroid.

10 mg. of Δ$^4$-19-nor-9β,10α-pregnene-17α,21-diol-3,20-dione obtained as described in our copending application Serial No. 210,211 filed July 16, 1962, were added to each 50 cc. of the vegetating culture of *Streptomyces roseochromogenus*, obtained as described above. The mixture was stirred for 48–72 hours with aereation and then extracted several times with methylene dichloride. The extract was washed with water, dried over anhydrous sodium sulfate, filtered and evaporated under reduced pressure.

The residue was purified by chromatography on silica gel thus giving Δ$^4$ - 19 - nor - 9β,10α-pregnene-16α,17α,21-triol-3,20-dione.

In a similar manner, Δ$^4$-19-nor-9β,10α-pregnene-17α,21-diol-3,11,20-trione was converted into Δ$^4$-19-nor-9β,10α-pregnene-16α,17α,21-triol-3,11,20-trione.

Example II

To 120 cc. of acetone containing 1 g. of Δ$^4$-19-nor-9β,10α-pregnene-16α,17α,21-triol-3,20-dione were added 30 drops of 70% perchloric acid. After 1 hour at room temperature 30 drops of pyridine were added and the resulting solution was evaporated to dryness under reduced pressure. 30 cc. of water were added to the residue and it was then extracted several times with 80 cc. of ethyl acetate. The combined extracts were washed to neutrality with water, dried over sodium sulfate and evaporated to dryness. The residue upon trituration with methanol gave a crude 16,17-acetonide. Recrystallization from the same solvent furnished 16α,17α-isopropylidenedioxy-Δ$^4$-19-nor-9β,10α-pregnene-21-ol-3,20-dione.

Example III

By following the method of Example I, 1 g. of 6α-methyl-Δ$^4$-19-nor-9β,10α-pregnene-17α,21 - diol - 3,11,20-trione was converted into 6α-methyl-Δ$^4$-19-nor-9β,10α-pregnene-16α,17α,21-triol-3,11,20-trione.

A solution of 500 mg. of the latter compound in 20 cc. of chloroform was treated with 1 g. of acetaldehyde and a few drops of 3N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding the 16,17-acetaldehyde acetal of 6α-methyl-Δ$^4$-19-nor-9β,10α-pregnene-16α,17α,21-triol-3,11,20-trione.

Example IV

A mixture of 1 g. of Δ$^4$-19-nor-9β,10α-pregnene-16α,17α,21-triol-3,20-dione, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16α,17α - acetophenonide of Δ$^4$ - 19 - nor - 9β,10α-pregnene-16α,17α,21-triol-3,20-dione.

In a similar manner Δ$^4$-19-nor-9β,10α-pregnene-16α,17α,21-triol-3,11,20-trione was converted into its 16α,17α-acetophenonide.

Example V

By following the methods of Examples I and II, 19-nor-9β,10α-hydrocortisone, obtained by adrenal incubation of Δ$^4$ - 19 - nor - 9β,10α - pregnene - 17α,21 - diol - 3,20 - dione was converted successively into 16α-hydroxy-19-nor- 9β,10α-hydrocortisone and 16α,17α-isopropylidenedioxy-Δ⁴-19-nor-9β,10α-pregnene-11β,21-diol-3,20-dione.

A mixture of 1 g. of the latter compound, 4 cc. of pyridine and 4 cc. of acetic anhydride was kept for 3 hours at room temperature. It was then poured into water and the formed precipitate collected by filtration, washed with water and air dried. Crystallization from acetone-ether gave the 21-acetate of 16α,17α-isopropylidenedioxy - Δ⁴ - 19 - nor - 9β,10α - pregnene - 11β,21-diol-3,20-dione.

*Example VI*

A suspension of 5 g. of 17,20;20,21-bismethylenedioxy-Δ⁴-19-nor-9β,10α-pregnene-3,11-dione in 37.5 cc. of anhydrous peroxide-free dioxane was treated with 6 cc. of freshly distilled ethyl orthoformate and 4 g. of p-toluenesulfonic acid. The mixture was stirred at room temperature for 15 minutes and the resulting solution let stand for 30 minutes further. 4 cc. of pyridine were added and then water. The formed precipitate was collected by filtration, water washed and air dried. Recrystallization from acetone-hexane afforded 17,20;20,21-bismethylenedioxy-3-ethoxy-Δ³,⁵-19-nor-9β,10α-pregnadien-11-one.

A mixture of 5 g. of the foregoing compound, 2 g. of anhydrous sodium acetate and 100 cc. of acetone was treated with 32 cc. of water and the solution was cooled to a temperature between 0 and 5° C. There was then added 1.1 molar equivalents of N-chlorosuccinimide and 2 cc. of glacial acetic acid and the mixture was stirred between 0 and 5° C. for 30 minutes. It was then diluted with water, kept overnight at 0° C. and the precipitate formed was collected, washed with water, and dried under vacuum. The crude 6β-chloro-Δ⁴-3-keto intermediate thus obtained was dissolved in 200 cc. of glacial acetic acid and a stream of dry hydrogen chloride was passed through the solution for 4 hours, at approximately 15° C. It was then diluted with water, extracted with methylene chloride and the organic extract washed with water, sodium carbonate solution and water to neutral, dried over anhydrous sodium sulfate and evaporated to dryness. Crystallization of the residue from acetone-hexane afforded the pure 17,20;20,21 - bismethylenedioxy - 6α - chloro - Δ⁴ - 19-nor-9β,10α-pregnene-3,11-dione.

A mixture of 2 g. of the foregoing compound and 40 cc. of 60% formic acid was heated on the steam bath for 1 hour, cooled, diluted with water and the precipitate was collected, washed with water, dried, and recrystallized from acetone-hexane, thus affording 6α-chloro-Δ⁴-19-nor-9β,10α-pregnene-17α,21-diol-3,11,20-trione.

In a similar manner, the compounds listed below under I gave as final products the compounds listed under II:

| I | II |
|---|---|
| 17,20;20,21-bismethylenedioxy-Δ⁴-19-nor-9β, 10α-pregnene-3-one. | 6α-chloro-Δ⁴-19-nor-9β, 10α-pregnene-17α, 21-diol-3,20-dione. |
| 16α-methyl-17,20; 20, 21-bismethylenedioxy-Δ⁴-19-nor-9β, 10α-pregnene-3-one. | 6α-chloro-16α-methyl-Δ⁴-19-nor-9β, 10α-pregnene-17α, 21-diol 3, 20-dione. |
| 16β-methyl-17,20; 20, 21-bismethylenedioxy-Δ⁴-19-nor-9β, 10α-pregnene-3-one. | 6α-chloro-16β-methyl-Δ⁴-19-nor-9β, 10α-pregnene-17α, 21-diol-3, 20-dione. |
| 16α-methyl-17, 20; 20, 21-bismethylenedioxy-Δ⁴-19-nor-9β, 10α-pregnene-3, 11-dione. | 6α-chloro-16α-methyl-Δ⁴-19-nor-9β, 10α-pregnene-17α, 21-diol-3, 11, 20-trione. |

*Example VII*

By following the method described in Preparation II, 1 g. of Δ⁴-19-nor-9β,10α-pregnene-16α,17α,21-triol-3,11,20-trione was treated with 37% aqueous formaldehyde, to produce 17,20;20,21 - bismethylenedioxy - Δ⁴ - 19 - nor - 9β,10α-pregnen-16α-ol-3,11-dione.

The foregoing compound was then submitted to the reactions described in the preceding example, to afford successively 17,20;20,21 - bismethylenedioxy - 3 - ethoxy-Δ³,⁵ - 19 - nor - 9β,10α - pregnadien - 16α - ol - 11 - one, 17,20;20,21 - bismethylenedioxy - 6β - chloro - Δ⁴ - 19-nor - 9β,10α - pregnen - 16α - ol - 3,11 - dione; 17,20;20,21 - bismethylenedioxy - 6α - chloro - Δ⁴ - 19 - nor - 9β,10α - pregnen - 16α - ol - 3,11 - dione and 6α - chloro-Δ⁴ - 19 - nor - 9β,10α - pregnene - 16α,17α,21 - triol - 3,11,20-trione.

The latter compound was then treated with acetone in the presence of perchloric acid in accordance with the method of Example II, to produce 16α,17α-isopropylidenedioxy - 6α - chloro - Δ⁴ - 19 - nor - 9β,10α - pregnen - 21-ol-3,11,20-trione.

*Example VIII*

1 g. of 17,20;20,21-bismethylenedioxy-3-ethoxy-Δ³,⁵-19-nor-9β,10α-pregnadien-11-one, intermediate of Example VI was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. The oily residue was dissolved in 50 cc. of glacial acetic acid and a stream of dry hydrochloric acid passed for a period of 6 hours, while maintaining the temperature around 15° C. The mixture was poured into cold water, the precipitate formed was separated, washed with water, dried and crystallized from acetone-hexane to yield 17,20;20,21-bismethylenedioxy - 6α - fluoro - Δ⁴ - 19 - nor - 9β, 10α - pregnene - 3,11-dione.

Upon hydrolysis of the bismethylenedioxy group with 60% formic acid, by following the method of Example VI, there was obtained 6α-fluoro-Δ⁴-19-nor-9β,10α-pregnene-17α,21-diol-3,11,20-trione.

In a similar manner, the Δ³,⁵-17,20;20,21-bismethylenedioxy-3-ethoxy intermediates of Examples VI and VII gave as final products: 6α-fluoro-Δ⁴-19-nor-9β,10α-pregnene-17α,21-diol-3,20-dione, 6α - fluoro - 16α - methyl-Δ⁴ - 19 - nor - 9β,10α - pregnene - 17α,21 - diol - 3,20 - dione, 6α - fluoro - 16β - methyl - Δ⁴ - 19 - nor - 9β,10α-pregnene - 17α,21 - diol - 3,20 - dione, 6α - fluoro - 16α-methyl - Δ⁴ - 19 - nor - 9β,10α - pregnene - 17α,21 - diol-3,11,20-trione and 6α-fluoro-Δ⁴-19-nor-9β,10α-pregnene-16α,17α,21-triol-3,11,20-trione.

*Example IX*

A solution of 1 g. of 17,20;20,21-bismethylenedioxy-6α-fluoro-Δ⁴-19-nor-9β,10α-pregnene-3,11-dione in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Saturated solution of sodium sulfate and solid sodium sulfate was added, the inorganic material filtered off and thoroughly washed with hot ethyl acetate, the combined organic solutions upon evaporation yielded a crude material, which was purified by crystallization from acetone-hexane thus giving 17,20;20,21-bismethylenedioxy-6α-fluoro-Δ⁴-10-nor-9β,10α-pregnene-3β,11β-diol.

A mixture of 1 g. of the foregoing compound, 20 cc. of dioxane, and 1.1 molar equivalents of 2,3-dichloro-5,6-dicyano 1,4-benzoquinone was stirred at room temperature for 3 hours. The hydroquinone formed during the reaction was filtered off, and the filtrate evaporated to dryness. The residue was dissolved in acetone and filtered through 20 g. of alumina. Crystallization from acetone hexane gave 17,20;20,21-bismethylenedioxy-6α-fluoro-Δ⁴-19-nor-9β,10α-pregnen-11β-ol-3-one.

The above compound was treated with 60% formic acid, by following the method of Example VI, to produce 6α - fluoro - Δ⁴ - 19 - nor - 9β,10α - pregnene - 11β,17α, 21-triol-3,20-dione.

By the same sequence of reactions, the compounds listed below under I (intermediates of Examples VI, VII and VIII) were converted into compounds under II:

| I | II |
|---|---|
| 6α-chloro-16α-methyl-17,20;20,21-bismethylenedioxy-Δ⁴-19-nor-9β,10α-pregnene-3,11-dione. | 6α-chloro-16α-methyl-Δ⁴-19-nor-9β,10α-pregnene-11β,17α,21-triol-3,20-dione. |
| 6α-chloro-17,20;20,21-bismethylenedioxy-Δ⁴-19-nor-9β,10α-pregnene-3,11-dione. | 6α-chloro-Δ⁴-19-nor-9β,10α-pregnene-11β,17α,21-triol-3,20-dione. |
| 17,20;20,21-bismethylenedioxy-6α-chloro-Δ⁴-19-nor-9β,10α-pregnene-16α-ol-3,11-dione. | 6α-chloro-Δ⁴-19-nor-9β,10α-pregnene-11β,16α,17α,21-tetrol-3,20-dione. |
| 6α-fluoro-16α-methyl-17,20;20,21-bismethylenedioxy-Δ⁴-19-nor-9β,10α-pregnene-3,11-dione. | 6α-fluoro-16α-methyl-Δ⁴-19-nor-9β,10α-pregnene-11β,17α,21-triol-3,20-dione. |
| 17,20;20,21-bismethylenedioxy-6α-fluoro-Δ⁴-19-nor-9β,10α-pregnene-16α-ol-3,11-dione. | 6α-fluoro-Δ⁴-19-nor-9β,10α-pregnene-11β,16α,17α,21-tetrol-3,20-dione. |

*Example X*

By following the method of Example II, 6α-chloro-Δ⁴-19 - nor - 9β,10α - pregnene - 11β,16α,17α,21 - tetrol-3,20-dione and 6α-fluoro-Δ⁴-19-nor-9β,10α-pregnene-11β,16α,17α,21-tetrol-3,20-dione were converted respectively into 6α - chloro - 16α,17α - isopropylidenedioxy - Δ⁴ - 19-nor-9β,10α-pregnene-11β,21-diol-3,20-dione and 6α-fluoro - 16α,17α - isopropylidenedioxy - Δ⁴ - 19 - nor - 9β, 10α-pregnene-11β,21-diol-3,20-dione.

*Example XI*

A mixture of 1 g. of 16α,17α-isopropylidenedioxy-Δ⁴-19-nor-9β,10α-pregnen-21-ol-3,20-dione, 4 cc. of pyridine and 2 cc. of acetic anhydride was kept overnight at room temperature. It was then poured into water and the formed precipitate collected by filtration, washed with water and air dried. Upon crystallization from acetone-hexane there was obtained the pure acetate of 16α,17α-isopropylenedioxy - Δ⁴ - 19 - nor - 9β,10α - pregnen - 21-ol-3,20-dione.

In a similar manner, 6α-chloro-Δ⁴-19-nor-9β,10α-pregnene - 17α,21 - diol - 3,11,20 - trione, 6α - chloro-16α-methyl - Δ⁴ - 19 - nor - 9β,10α - pregnene - 17α,21 - diol-3,11,20-trione and 6α-fluoro-Δ⁴-19-nor-9β,10α-pregnene-11β,17α-triol-3,20-dione were converted into the corresponding 21-acetates.

*Example XII*

By following the method of the preceding example, the compounds listed below under I were converted into the 21-monoesters II using the appropriate carboxylic acid anhydrides.

| I | Acylating Agent | II |
|---|---|---|
| 6α-chloro-16α-methyl-Δ⁴-19-nor-9β,10α-pregnene-17α,21-diol-3,11,20-trione. | Propionic anhydride | 21-propionate of 6α-chloro-16α-methyl-Δ⁴-19-nor-9β,10α-pregnene-17α,21-diol-3,11,20-trione. |
| 6α-fluoro-16β-methyl-Δ⁴-19-nor-9β,10α-pregnene-17α,21-diol-3,20-dione. | Caproic anhydride | 21-caproate of 6α-fluoro-16β-methyl-Δ⁴-19-nor-9β,10α-pregnene-17α,21-diol-3,20-dione. |
| 6α-fluoro-16α-methyl-Δ⁴-19-nor-9β,10α-pregnene-17α,21-diol-3,11,20-trione. | Cyclopentyl-propionic anhydride. | 21-cyclopentylpropionate of 6α-fluoro-16α-methyl-Δ⁴-19-nor-9β,10α-pregnene-17α,21-diol-3,11,20-trione. |
| 6α-fluoro-16α,17α-isopropylidenedioxy-Δ⁴-19-nor-9β,10α-pregnene-11β,21-diol-3,20-dione. | Propionic anhydride. | 21-propionate of 6α-fluoro-16α,17α-isopropylidenedioxy-Δ⁴-19-nor-9β,10α-pregnene-11β,21-diol-3,20-dione. |
| 6α-fluoro-16α-methyl-Δ⁴-19-nor-9β,10α-pregnene-11β,17α,21-triol-3,20-dione. | Undecenoic anhydride. | 21-undecenoate of 6α-fluoro-16α-methyl-Δ⁴-19-nor-9β,10α-pregnene-11β,17α,21-triol-3,20-dione. |

*Example XIII*

A mixture of 1 g. of Δ⁴-19-nor-9β,10α-pregnene-16α,17α,21-triol-3,20-dione, 4 cc. of pyridine and 4 cc. of acetic anhydride was heated on the steam bath for 1 hour. It was then poured into water, the formed precipitate collected by filtration and air dried. Crystallization from chloroform-ether gave the 16,21-diacetate of Δ⁴-19-nor-9β,10α-pregnene-16α,17α,21-triol-3,20-dione.

Similarly, 6α - methyl - Δ⁴ - 19 - nor-9β,10α-pregnene-16α,17α,21 - triol - 3,11,20 - trione, 6α - fluoro - Δ⁴ - 19-nor - 9β,10α - pregnene - 16α,17α,21 - triol - 3,11,20 - trione and 6-chloro-Δ⁴-19-nor-9β,10α-pregnene-11β,16α,17α,21-tetrol-3,20-dione were converted into the respective 16,21-diacetates.

When propionic, caproic or enanthic anhydride were used as acylating agents there were obtained the corresponding 16,21-diesters of such compounds.

*Example XIV*

A mixture of 1 g. of the acetate of 16α,17α-isopropylidenedioxy-Δ⁴-19-nor-9β,10α-pregnen-21-ol-3,20-dione, 2 g. of chloranil and 50 cc. of terbutanol was refluxed for 8 hours. The mixture was cooled, the excess of chloranil filtered off and washed with ethyl acetate and the organic extracts washed with a cold solution of 10% sodium hydroxide until the washings were colorless. It was then dried over anhydrous sodium sulfate and evaporated to dryness. Recrystallization from methylene chloride-ether, after decolorization with alumina give the pure acetate of 16α,17α-isopropylidenedioxy-Δ⁴,⁶-19-nor-9β, 10α-pregnadien-21-ol-3,20-dione.

*Example XV*

A mixture of 1 g. of the 21-acetate of 6α,16α-dimethyl-Δ⁴-19-nor-9β,10α-pregnene-11β,17α,21-triol-3,20-dione, 2 g. of chloranil and 10 cc. of xylene was refluxed under an atmosphere of nitrogen for 16 hours. The mixture was cooled, washed with a cold 10% sodium hydroxide solution, then with water, dried over anhydrous sodium sulfate and the xylene was evaporated under reduced pressure. Chromatography of the residue on neutral alumina and recrystallization from acetone-hexane afforded the 21-acetate of 6,16α-dimethyl-Δ⁴,⁶-19-nor-9β,10α-pregnadiene-11β,17α,21-triol-3,20-dione.

*Example XVI*

In accordance with the method described in Example XIV, starting from the Δ⁴-compounds, there were obtained the following 6-dehydro derivatives: 21-acetate of 16α,17α - isopropylidenedioxy-Δ⁴,⁶-19-nor-9β,10α-pregnadiene-11β,21-diol-3,20-dione, 21-acetate of 6-chloro-Δ⁴,⁶-19-nor-9β,10α-pregnadiene-17α,21-diol-3,11,20-trione, 21-acetate of 6-chloro-16α-methyl-Δ⁴,⁶-19-nor-9β,10α-pregnadiene-17α,21-diol-3,11,20-trione, 21-acetate of 6-fluoro-Δ⁴,⁶ - 19 - nor-9β,10α-pregnadiene-11β,17α-21-triol-3,20-dione, 21-propionate of 6-fluoro-16α,17α-isopropylidenedioxy - Δ⁴,⁶ - 19-nor-9β,10α-pregnadiene-11β,21-diol-3,20-dione, 16,21-diacetate of Δ⁴,⁶-19-nor-9β,10α-pregnadiene-16α,17α-21-triol-3,20-dione, 21-acetate of 6-methyl-Δ⁴,⁶-19-nor-9β,10α-pregnadiene-17α,21-diol-3,11,20-trione, 21-acetate of 6-methyl-Δ⁴,⁶-19-nor-9β,10α-pregnadiene-17α, 21-diol-3,20-dione, 21-acetate of 6,16-dimethyl-Δ⁴,⁶-19-nor - 9β,10α-pregnadiene-17α,21-diol-3,11,20-trione, 21-acetate of Δ⁴,⁶-19-nor-9β,10α-pregnadiene-11β,17α-21-triol-3,20-dione, 21-acetate of Δ⁴,⁶-19-nor-9β,10α-pregnadiene-17α,21-diol-3,20-dione and 21-acetate of Δ⁴,⁶-19-nor-9β,10α-pregnadiene-17α,21-diol-3,11,20-trione.

*Example XVII*

By following the esterification method of Example XI, 500 mg. of the 16,17-acetaldehyde acetal of 6α-methyl-Δ⁴ - 19 - nor - 9β,10α-pregnene-16α,17α,21-triol-3,11,20-trione were converted into its 21-acetate.

The latter compounds were then dehydrogenated with chloranil in xylene in accordance with the method of Example XV, to produce the 16,17-acetaldehyde acetal of 6 - methyl - Δ$^{4,6}$ - 19-nor-9β,10α-pregnadiene-16α,17α,21-triol-3,11,20-trione 21-acetate.

Example XVIII

By following the method of Example XIV, 1 g. of 17,20;20,21 - bismethylenedioxy - 6α-chloro-Δ$^4$-19-nor-9β,10α-pregnene-3,11-dione was converted into 17,20;20,21-bismethylenedioxy - 6-chloro-Δ$^{4,6}$-19-nor-9β,10α-pregnadiene-3,11-dione. Upon hydrolysis of the foregoing compound with 60% formic acid there was produced 6-chloro - Δ$^{4,6}$ - 19-nor-9β,10α-pregnadiene-17α,21-diol-3,20-trione.

Similarly, 16α-methyl-17,20;20,21-bismethylenedioxy-Δ$^4$-19-nor-9β,10α-pregnene-3,11-dione and 16β-methyl-17,20;20,21 - bismethylenedioxy - Δ$^4$-19-nor-9β,10α-pregnene-3-one gave as final products 16α-methyl-Δ$^{4,6}$-19-nor-9β,10α-pregnadiene-17α,21-diol-3,11,20-trione and 16β-methyl - Δ$^{4,6}$ - 19-nor-9β,10α-pregnadiene-17α,21-diol-3,20-dione.

Example XIX

A solution of 1 g. of the 21-acetate of Δ$^{4,6}$-19-nor-9β,10α-pregnadiene-17α,21-diol-3,11,20-trione, in 50 cc. of methanol was treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing Δ$^{4,6}$-19-nor-9β,10α-pregnadiene-17α,21-diol-3,20-dione.

By the same method, all the compounds obtained in Example XVI were saponified, to produce the respective free compounds, namely: 16α,17α-isopropylidenedioxy-Δ$^{4,6}$-19-nor-9β,10-pregnadiene-11β,21-diol-3,20-dione, 6-chloro - Δ$^{4,6}$ - 19-nor-9β,10α-pregnadiene-17α,21-diol-3,11,20 - trione, 6-chloro-16α-methyl-Δ$^{4,6}$-19-nor-9β,10α-pregnadiene-17α,21-diol-3,11,20-trione, 6-fluoro-Δ$^{4,6}$-19-nor - 9β,10α-pregnadiene-11β,17α,21-triol-3,20-dione, 6-fluoro - 16α,17α-isopropylidenedioxy-Δ$^{4,6}$-19-nor-9β,10α-pregnadiene-11β,21-diol-3,20-dione, Δ$^{4,6}$-19 - nor - 9β,10α-pregnadiene - 16α,17α,21-triol-3,20-dione, 6-methyl-Δ$^{4,6}$-19-nor-9β,10α-pregnadiene-17α,21-diol-3,11,20-trione, 6-methyl - Δ$^{4,6}$-19-nor-9β,10α-pregnadiene-17α,21-diol-3,20-dione, 6,16-dimethyl-Δ$^{4,6}$-19-nor-9β,10α-pregnadiene-17α,21 - diol-3,11,20-trione, Δ$^{4,6}$-19-nor-9β,10α-pregnadiene-11β,17α,21 - triol-3,20-dione, Δ$^{4,6}$-19-nor-9β,10α-pregnadiene-17α,21-diol-3,20-dione and Δ$^{4,6}$-19-nor-9β,10α-pregnadiene-17α,21-diol-3,11,20-trione.

We claim:

1. A compound of the following formula:

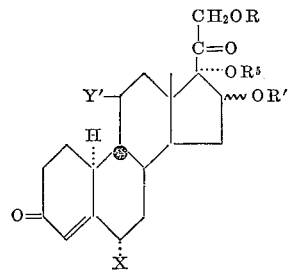

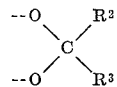

wherein R and R$^1$ are selected from the group consisting of hydrogen and a hydrocarbon carboxylic acyl radical of less than 12 carbon atoms, R$^5$ represents hydrogen, OR$^5$ and OR$^1$ taken together represent the grouping $$\begin{array}{c} --O \\ \phantom{--}\diagdown \\ \phantom{----}C \\ \phantom{--}\diagup\phantom{--}\diagdown \\ --O \phantom{----} R^3 \end{array} \begin{array}{c} R^2 \\ \\ \\ \\ \end{array}$$

wherein R$^2$ represents a lower alkyl radical of less than 8 carbon atoms and R$^3$ is selected from the group consisting of hydrogen, lower alkyl, aryl and aralkyl of less than 8 carbon atoms, X is selected from the group consisting of hydrogen and methyl and Y$^1$ is selected from the group consisting of hydrogen and keto.

2. Δ$^4$-19-nor-9β,10α-pregnene - 16α,17α,21 - triol - 3,11,20-trione.

3. 6α-methyl-Δ$^4$-19-nor-9β,10α - pregnene - 16α,17α,21-triol-3,11,20-trione.

4. 16α,17α-isopropylidenedioxy - Δ$^4$ - 19 - nor - 9β,10α-pregnen-21-ol-3,20-dione.

5. A compound of the following formula:

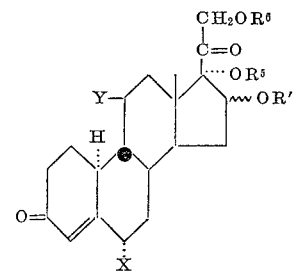

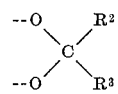

wherein R$^1$ is selected from the group consisting of hydrogen and a hydrocarbon carboxylic acyl radical of less than 12 carbon atoms, R$^5$ represents hydrogen, R$_6$ represents a hydrocarbon carboxylic acyl radical of less than 12 carbon atoms, OR$^5$ and OR$^1$ taken together represent the grouping $$\begin{array}{c} --O \\ \phantom{--}\diagdown \\ \phantom{----}C \\ \phantom{--}\diagup\phantom{--}\diagdown \\ --O \phantom{----} R^3 \end{array} \begin{array}{c} R^2 \\ \\ \\ \\ \end{array}$$

wherein R$^2$ represents a lower alkyl radical of less than 8 carbon atoms and R$^3$ is selected from the group consisting of hydrogen, lower alkyl, aryl and aralkyl of less than 8 carbon atoms, X is selected from the group consisting of hydrogen and methyl and Y is selected from the group consisting of hydrogen, β-hydroxy and keto.

6. The 21-acetate of 16α,17α-isopropylidenedioxy-Δ$^4$-19-nor-9β,10α-pregnene-11β,21-diol-3,20-dione.

7. A compound of the following formula:

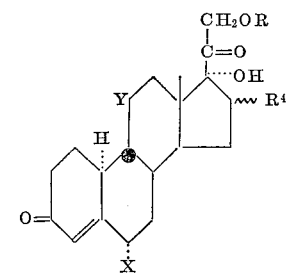

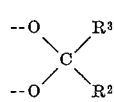

wherein R is selected from the group consisting of hydrogen and a hydrocarbon carboxylic acyl radical of less than 12 carbon atoms; Y is selected from the group consisting of hydrogen, β-hydroxy and keto; R$^4$ is selected from the group consisting of hydrogen, α-methyl, β-methyl, α-hydroxy, α-acyloxy and R$^4$ together with the 17α-hydroxy group represents the radial $$\begin{array}{c} --O \\ \phantom{--}\diagdown \\ \phantom{----}C \\ \phantom{--}\diagup\phantom{--}\diagdown \\ --O \phantom{----} R^2 \end{array} \begin{array}{c} R^3 \\ \\ \\ \\ \end{array}$$

wherein R$^2$ represents a lower alkyl group of less than 8 carbon atoms, R$^3$ is selected from the group consisting of hydrogen, lower alkyl, aryl and aralkyl of less than 8 carbon atoms, and X$^1$ is selected from the group consisting of fluorine and chlorine.

8. 6α-chloro-Δ$^4$-19-nor-9β,10α-pregnene - 17α,21 - diol-3,11,20-trione.

9. 6α-chloro-16α-methyl-Δ$^4$-19-nor - 9β,10α - pregnene-11β,17α,21-triol-3,20-dione.

10. 6α-fluoro-Δ⁴-19-nor-9β,10α-pregnene-17α,21 - diol-3,11,20-trione.

11. 6α-fluoro-16α-methyl-Δ⁴-19-nor-9β-10α - pregnene-11β,17α,21-triol-3,20-dione.

12. 6α-fluoro-16α,17α-isopropylidenedioxy-Δ⁴-19 - nor-9β,10α-pregnene-11β,21-diol-3,20-dione.

13. 6α-fluoro-Δ⁴-19-nor-9β,10α-pregnene - 16α,17α,21-triol-3,11,20-trione.

14. A compound of the following formula:

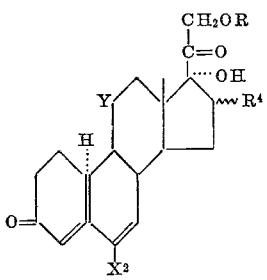

wherein R is selected from the group consisting of hydrogen and a hydrocarbon carboxylic acyl radical of less than 12 carbon atoms; Y is selected from the group consisting of hydrogen, β-hydroxy and keto; R⁴ is selected from the group consisting of hydrogen, α-methyl, β-methyl, α-hydroxy, α-acyloxy and R⁴ together with the 17α-hydroxy group represents the radical

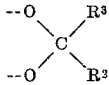

wherein $R_2$ represents a lower alkyl group of less than 8 carbon atoms; $R^3$ is selected from the group consisting of hydrogen, lower alkyl, aryl and aralkyl of less than 8 carbon atoms; and $X^2$ is selected from the group consisting of hydrogen, methyl, chlorine and fluorine.

15. Δ⁴,⁶-19-nor-9β,10α-pregnadiene-17α-21-diol - 3,20-dione.

16. 16α-methyl-Δ⁴,⁶-19-nor-9β,10α - pregnadiene - 17α,21-diol-3,11,20-trione.

17. 6-methyl-Δ⁴,⁶-19-nor-9β,10α - pregnadiene - 17α,21-diol-3,11,20-trione.

18. 6-fluoro-Δ⁴,⁶-19-nor-9β,10α-pregnadiene - 11β,17α,21-triol-3,20-dione.

19. 6-fluoro-16α,17α-isopropylidenedioxy-Δ⁴,⁶-19 - nor-9β,10α-pregnadiene-11β,21-diol-3,20-dione.

20. The 21-acetate of 6,16α-dimethyl-Δ⁴,⁶-19-nor-9β,10α-pregnadiene-11β,17α,21-triol-3,20-dione.

References Cited by the Examiner

Brown et al.: "J. Org. Chem." (1961), pp. 5033–5036.

LEWIS GOTTS, *Primary Examiner.*